United States Patent
Lo et al.

(10) Patent No.: US 9,781,730 B2
(45) Date of Patent: Oct. 3, 2017

(54) TRANSMISSION OF SYNCHRONIZATION AND CONTROL SIGNALS IN A BROADBAND WIRELESS SYSTEM

(71) Applicant: Neocific, Inc., Bellevue, WA (US)

(72) Inventors: Titus Lo, Bellevue, WA (US); Xiaodong Li, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 0 days.

(21) Appl. No.: 14/690,998

(22) Filed: Apr. 20, 2015

(65) Prior Publication Data

US 2015/0230261 A1    Aug. 13, 2015

Related U.S. Application Data

(63) Continuation of application No. 14/257,928, filed on Apr. 21, 2014, now Pat. No. 9,014,128, which is a continuation of application No. 13/393,159, filed as application No. PCT/US2011/058476 on Oct. 28, 2011, now Pat. No. 8,705,399.

(60) Provisional application No. 61/455,986, filed on Oct. 29, 2010.

(51) Int. Cl.
| | |
|---|---|
| *H04W 4/06* | (2009.01) |
| *H04W 24/00* | (2009.01) |
| *H04W 36/00* | (2009.01) |
| *H04W 72/08* | (2009.01) |
| *H04L 5/00* | (2006.01) |
| *H04L 27/26* | (2006.01) |
| *H04W 72/04* | (2009.01) |

(52) U.S. Cl.
CPC ........ *H04W 72/082* (2013.01); *H04L 5/0007* (2013.01); *H04L 5/0046* (2013.01); *H04L 5/0048* (2013.01); *H04L 5/0053* (2013.01); *H04L 5/0062* (2013.01); *H04L 27/26* (2013.01); *H04L 27/261* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 7,643,537 | B1 * | 1/2010 | Giallorenzi | H04B 1/7093 375/142 |
| 8,982,759 | B2 * | 3/2015 | Kim | H04L 1/0072 370/310 |
| 2002/0034191 | A1 | 3/2002 | Shattil | |
| 2004/0081131 | A1 | 4/2004 | Walton et al. | |
| 2004/0100897 | A1 | 5/2004 | Shattil | |
| 2004/0179627 | A1 | 9/2004 | Ketchum et al. | |

(Continued)

*Primary Examiner* — Phuc Tran
*Assistant Examiner* — Soon-Dong D Hyun
(74) *Attorney, Agent, or Firm* — Baker & Hostetler LLP

(57) ABSTRACT

In a broadband wireless communication system, a primary control signal may be relocated within the operation band for transmission while avoiding interference. For example, if the primary control signal employs P contiguous subcarriers, the primary control signal can be placed in any section of the band that has P contiguous subcarriers. If a narrow-band interferer appears at one end of the band, the primary control signals can be placed at the other end. If the interferer appears in the middle, the primary can be relocated to either end of the band. The placement of primary control signals can be changed as the interference environment changes.

18 Claims, 16 Drawing Sheets

(56) References Cited

U.S. PATENT DOCUMENTS

| | | |
|---|---|---|
| 2006/0089102 A1* | 4/2006 | Nishio .................. H04L 1/0003 |
| | | 455/67.11 |
| 2006/0262871 A1 | 11/2006 | Cho et al. |
| 2007/0177631 A1 | 8/2007 | Popovic et al. |
| 2007/0211814 A1 | 9/2007 | Walton et al. |
| 2008/0049596 A1 | 2/2008 | Khojastepour et al. |
| 2008/0273582 A1 | 11/2008 | Gaal et al. |
| 2009/0060081 A1 | 3/2009 | Zhang et al. |
| 2009/0135803 A1 | 5/2009 | Luo et al. |
| 2009/0220014 A1 | 9/2009 | Higuchi et al. |
| 2009/0258628 A1 | 10/2009 | Lindoff et al. |
| 2010/0020786 A1 | 1/2010 | Futaki et al. |
| 2010/0099423 A1 | 4/2010 | Ogawa et al. |
| 2010/0165882 A1 | 7/2010 | Palanki et al. |
| 2010/0195700 A1 | 8/2010 | Ogawa et al. |
| 2011/0007704 A1 | 1/2011 | Swarts et al. |
| 2011/0103501 A1 | 5/2011 | Khojastepour et al. |
| 2012/0033624 A1* | 2/2012 | Luo ........................ H04B 7/024 |
| | | 370/329 |
| 2012/0134328 A1* | 5/2012 | Gauvreau ............. H04L 5/0037 |
| | | 370/329 |
| 2012/0287920 A1 | 11/2012 | Futaki et al. |
| 2013/0044678 A1 | 2/2013 | Qu et al. |
| 2013/0100904 A1 | 4/2013 | Kim et al. |

\* cited by examiner

TRANSMISSION OF SYNCHRONIZATION AND CONTROL SIGNALS IN A BROADBAND WIRELESS SYSTEM

CROSS REFERENCE TO RELATED APPLICATIONS

This application is a continuation of U.S. patent application Ser. No. 14/257,928, filed Apr. 21, 2014, now U.S. Pat. No. 9,014,128, issued Apr. 21, 2015, which is a continuation of U.S. patent application Ser. No. 13/393,159, filed Feb. 28, 2012, now U.S. Pat. No. 8,705,399, issued Apr. 22, 2014, which is the National Stage of International Application No. PCT/US2011/058476, filed Oct. 28, 2011, which claims the benefit of U.S. Provisional Application No. 61/455,986, filed Oct. 29, 2010, the disclosures of which are incorporated herein by reference in their entireties.

TECHNICAL FIELD

The disclosed embodiments relate, in general, to wireless or wire-line communications and include methods and apparatus for transmission of synchronization and control signals, although these are merely exemplary and non-limiting fields.

BACKGROUND

In an LTE system, the synchronization (SYNC) signals and the broadcasting signals on the physical broadcast channel (PBCH) occupy a relatively narrow bandwidth (1.08 MHz) and are fixed at the center of the operation channel of a much wider bandwidth. The SYNC signals and information carried on the PBCH are crucial to system operation. The SYNC signals, generated based on Zadoff-Chu sequences, enable a mobile station to find the base station of the cell that the mobile station is in and to synchronize with the network. The PBCH carries critical system control information that a mobile needs to access the network. Since LTE is designed for use on a licensed spectrum, there is no need to consider interference originated from other systems (i.e., no inter-system interference). In this case, the fixed-location design of SYNC signals and PBCH is sufficient for the operation of the system.

Recently, the premium spectrum bands have been opened up by regulators for unlicensed use, especially TV channels that are now available due to switching from analogue to digital TV broadcasting. In an unlicensed environment, there may be considerably more interference from various sources. When used in such an environment, the fixed-location design of SYNC signals and PBCH such as in an LTE system may not cope well with interference. The SYNC signals and PBCH may be vulnerable in cases where a narrow-band interferer is present where the SYNC signals and PBCH are in frequency, as depicted in FIG. 1. As a result, performance of the system may be greatly degraded.

SUMMARY

In accordance with various embodiments of the present invention, in a broadband wireless communication system, a primary control signal can be relocated within the operation band for transmission while avoiding interference. For example, if the primary control signal employs P contiguous subcarriers, the primary control signal can be placed in any section of the band that has P contiguous subcarriers. If a narrow-band interferer appears at one end of the band, the primary control signals can be placed at the other end. If the interferer appears in the middle, the primary can be relocated to either end of the band. The placement of primary control signals can be changed as the interference environment changes; that is, the relocation of a primary control signal can be adaptive to interference environment.

BRIEF DESCRIPTION OF THE DRAWINGS

The systems, methods, and computer readable media for communicating in a wireless communications system in accordance with this specification are further described with reference to the accompanying drawings in which.

DETAILED DESCRIPTION OF ILLUSTRATIVE EMBODIMENTS

Figure 1:
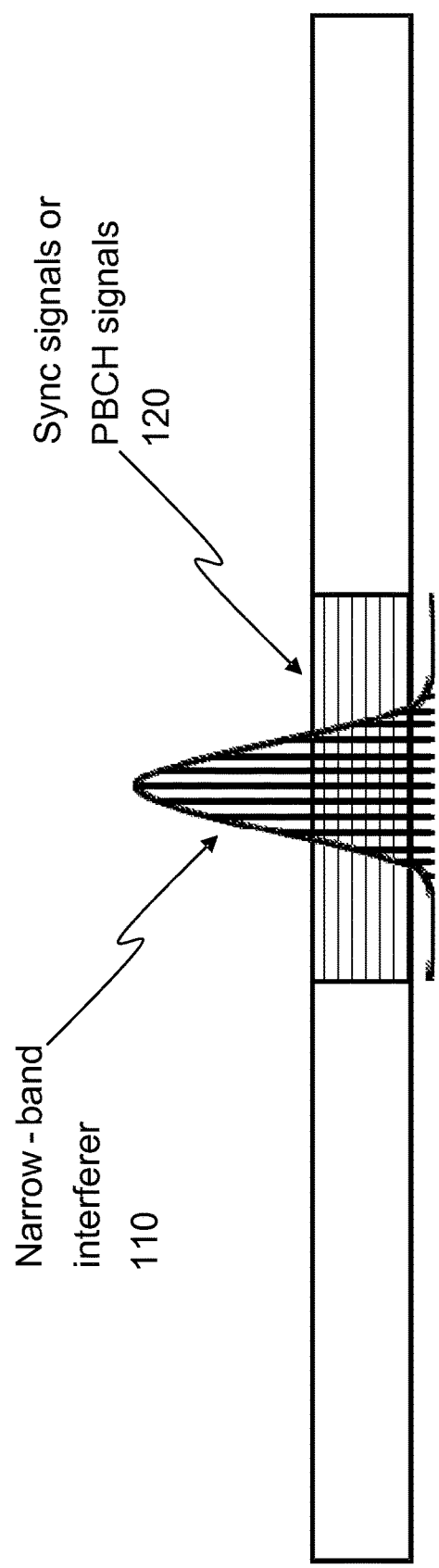
FIG. 1 depicts, using frequency, a scenario in which a narrow-band interferer appears where the SYNC signals and PBCH are located.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Some of the embodiments described herein describe methods and systems for flexible frequency-division duplex (FFDD) transmission. The methods and systems may also be combined with a traditional TDD or FDD system to create a hybrid system. The multiple access technology mentioned herein can be of any special format such as Code Division Multiple Access (CDMA), Time Division Multiple Access (TDMA), Frequency Division Multiple Access (FDMA), Orthogonal Frequency Division Multiple Access (OFDMA), Multi-Carrier Code Division Multiple Access (MC-CDMA), or Carrier Sensing Multiple Access (CSMA).

Without loss of generality, OFDMA is employed herein as an example to illustrate different aspects of these embodiments.

Figure 2:
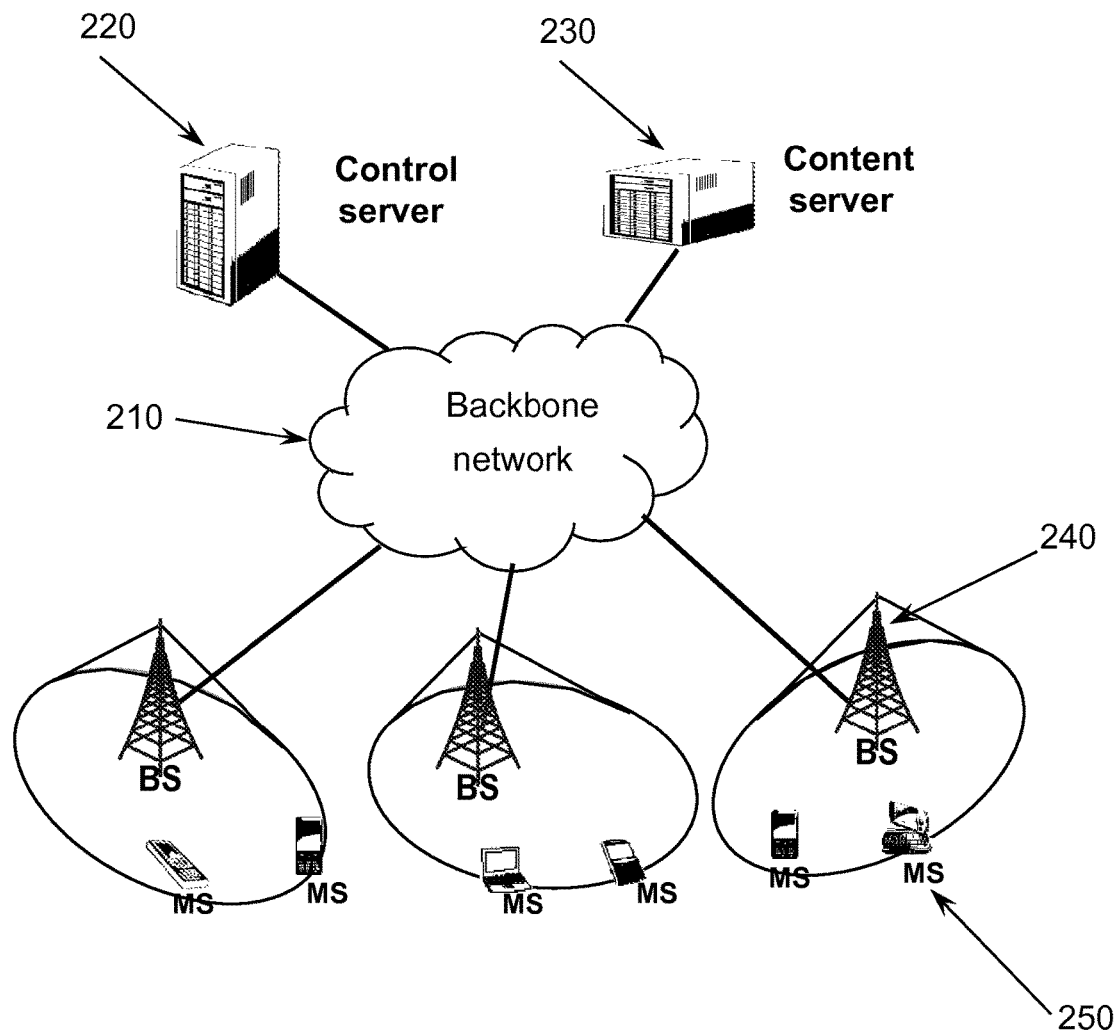
FIG. 2 depicts a representative diagram of a wireless communication system with a control server, a content server, a backbone network, base stations (BS) and mobile stations (MS).

FIG. 2 is a representative diagram of a wireless communication system with base stations (BS) 240 and mobile stations (MS) 250. A control server (CS) 220 controls one or multiple base stations (BS). Control server 220 is connected to the base stations via the backbone network 210. Control server 220 coordinates multimedia content broadcast, including terrestrial/mobile TV, for example, via a single frequency network (SFN) and cellular data unicast, such as voice-over-IP and internet traffic. In some embodiments, backbone network 210 is a packet data network that can either be a wired or a wireless network. Backbone network 210 may also connect to other servers in the system, such as multimedia content servers 230 and network management servers.

The geographic region serviced by the system may be divided into a plurality of cells, and wireless coverage may be provided in each cell by a base station. One or more mobile devices may be fixed or may roam within the geographic region. The mobile devices may be used as an interface between users and the network. A base station may serve as a focal point to transmit information to and receive information from the mobile devices within the cell that it serves by radio signals. A base station may be a macro-station that covers a large geographical area or a macro-cell, a micro or pico station that covers a small area or a micro/pico-cell, or a femto station that typically covers an indoor area or a femtocell. Those skilled in the art will appreciate that if a cell is divided into sectors, each sector can be considered a cell. In this context, the terms "cell" and "sector" are interchangeable.

The transmission from a base station to a mobile station may be called a downlink (DL) and the transmission from a mobile station to a base station may be called an uplink (UL). The transmission may take place within a frequency range extending between two limiting frequencies. This range of frequency resource may be defined as an operating frequency band/channel or simply band in this text. The center of the frequency range is typically the center frequency or carrier frequency and the span of the frequency range is normally referred to as the bandwidth. For example, the frequency band for Broadcast Channel 36 in the United States is centered at 605 MHz with a bandwidth of 6 MHz. In another example, a 3GPP WCDMA system may use a 5 MHz DL band and a 5 MHz UL band.

FIG. 2 is a representative diagram of a wireless communication system with base stations (BS) and mobile stations (MS). There is a control server (CS) that controls one or multiple base stations (BS). The control server is connected to the base stations via the backbone network. It coordinates multimedia content broadcast, including terrestrial/mobile TV, for example, via a single frequency network (SFN) and cellular data unicast, such as voice-over-IP and internet traffic. In the presently disclosed embodiments, the backbone network may be a packet data network that can either be a wired or a wireless network. The backbone network may also connect to other servers in the system, such as multimedia content servers and network management servers.

The geographic region serviced by the system may be divided into a plurality of cells, and wireless coverage may be provided in each cell by a base station. One or more mobile devices may be fixed or may roam within the geographic region. The mobile devices may be used as an interface between users and the network. A base station may serve as a focal point to transmit information to and receive information from the mobile devices within the cell that it serves by radio signals. A base station may be a macro-station that covers a large geographical area or a macro-cell, a micro or pico station that covers a small area or a micro/pico-cell, or a femto station that typically covers an indoor area or a femtocell. Those skilled in the art will appreciate that if a cell is divided into sectors, from a system engineering point of view each sector can be considered as a cell. In this context, the terms "cell" and "sector" are interchangeable.

The transmission from a base station to a mobile station is called a downlink (DL) and the transmission from a mobile station to a base station is called an uplink (UL). The transmission takes place within a frequency range extending between two limiting frequencies. This range of frequency resource is defined as an operating frequency band/channel or simply band in this text. The center of the frequency range is usually called the center frequency or carrier frequency and the span of the frequency range is normally referred to as the bandwidth.

Figure 3:
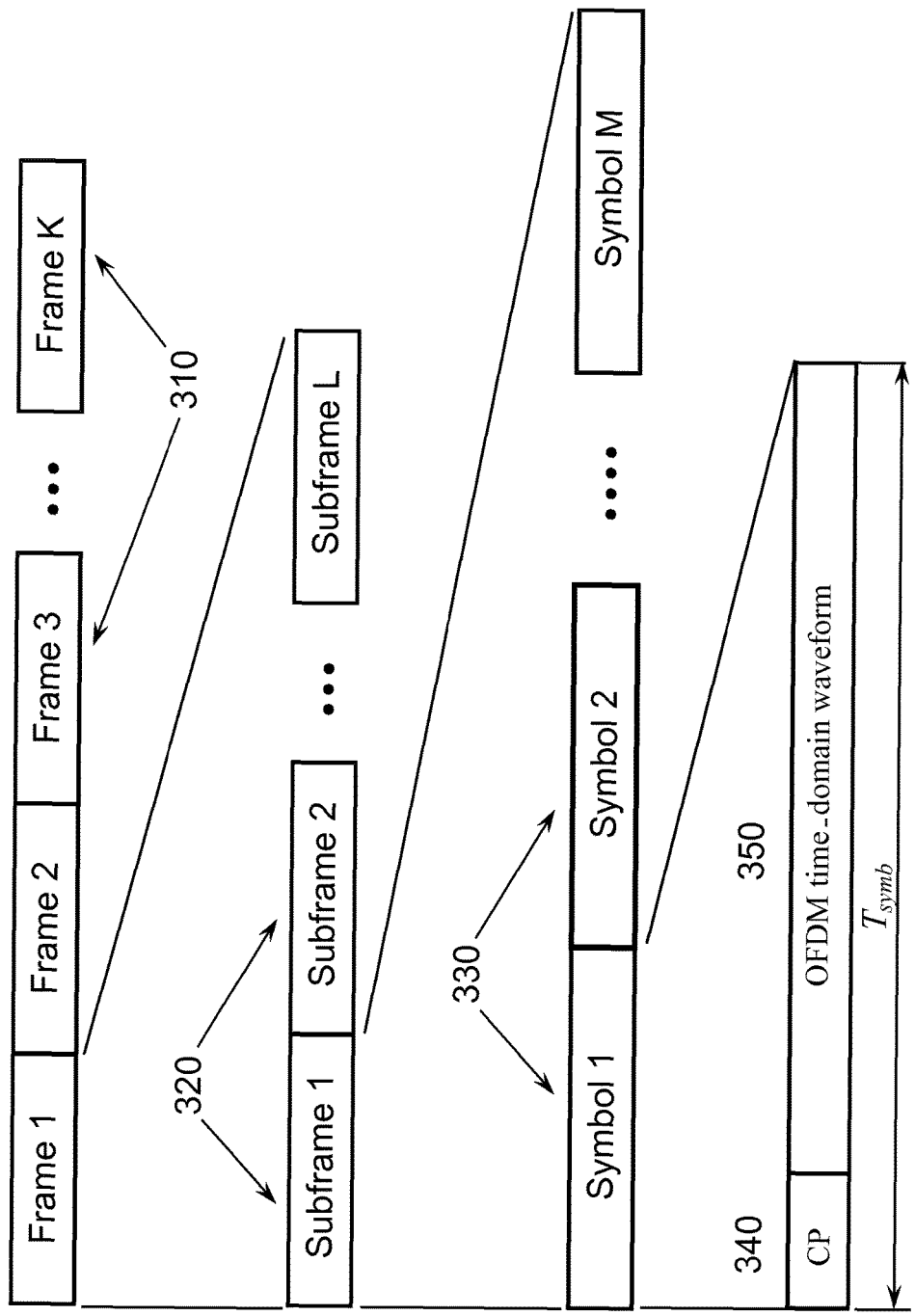
FIG. 3 is a graphical depiction of a typical radio frame structure in the time domain.

The wireless communication system may use a certain radio frame structure to facilitate the transmission. For example, a radio frame may consist of multiple (L) subframes and each subframe may comprise multiple (M) OFDM symbols, as shown in FIG. 3. In some embodiments, multiple (K) frames may form a super frame. In other embodiments, a subframe may be further divided into multiple time slots and each slot may comprise multiple OFDM symbols. Those skilled in the art will appreciate that the division of radio frames and its granularity are to facilitate radio transmission. Other forms of division or other nomenclature may, of course, be used depending on the requirements of the communication system.

The OFDM time domain waveform is generated by applying the inverse-fast-Fourier-transform (IFFT) to the OFDM signals in the frequency domain. A basic structure of a multi-carrier signal in the frequency domain is made up of subcarriers, which can be modulated to carry information data and reference signals. A copy of the last portion of the time waveform, known as the cyclic prefix (CP), is inserted at the beginning of the waveform itself to form an OFDM symbol.

Figure 4:
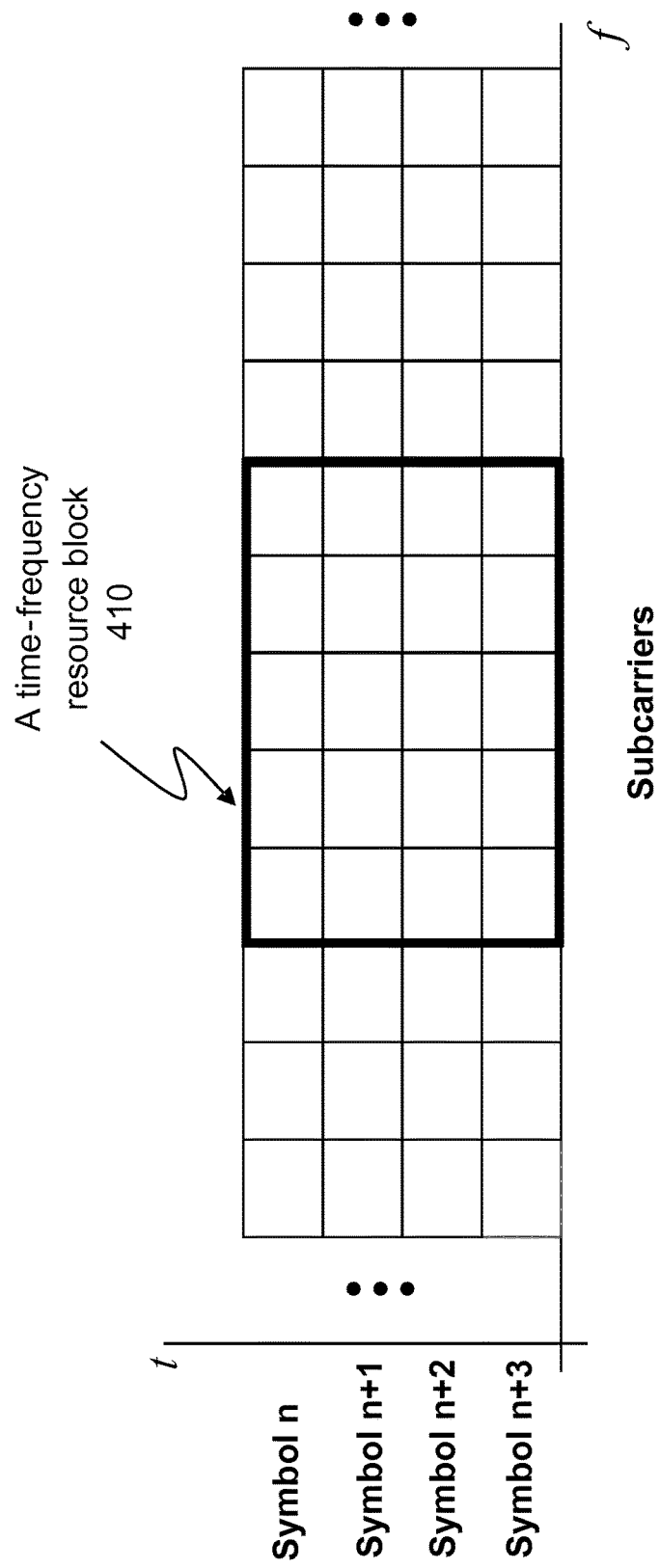
FIG. 4 depicts a representation of a time-frequency resources block consisting of multiple subcarriers in multiple consecutive symbols.

The basic structure of an OFDM signal in the frequency domain is made up of subcarriers. For a given bandwidth of a spectral band or channel, the number of usable subcarriers is finite and limited, the value of which depends on the size of the FFT and the sampling frequency and the effective bandwidth. OFDM symbols and subcarriers can be arranged into time-frequency resource blocks, each of which consists of multiple subcarriers in multiple consecutive symbols as shown in FIG. 4, to support scalability and multiple-access. One or more resource blocks may be used to form a subchannel dedicated for control information or/and data information.

In one embodiment, the same structure of the transmission frame may be used by all the cells within the system and frames may be transmitted in synchronization among the cells. Primary control signals such as synchronization signals and broadcasting signals on physical broadcast channels may be transmitted using one or more OFDM symbols in a frame or subframe.

In a broadband wireless communication system, a primary control signal is broadcasted from a base station to mobile stations. A primary control signal may be referred to as a preamble, synchronization signal, reference signal, header, broadcast control channel, or other terms in the industry. Notwithstanding the nomenclature, its purpose is crucial to system operation. The primary control signal carries timing, frequency, cell identity, system parameter information, which enables a mobile station to find the base station of the cell it is in, to synchronize with the network, and to access to the network. In the following, the terms "control signal" and "control channel" may be used interchangeably, whereas a control channel is used to carry the so-mentioned control signal and a control signal is carried in the so-mentioned control channel.

In some embodiments, the primary control signal comprises a synchronization signal (SYNC), which may be used by mobile stations for functions such as time synchronization, frequency synchronization, and cell identification. A SYNC may further comprise a primary synchronization signal (PSS) and a secondary synchronization signal (SSS) for multi-step execution of the mobile functions. A SYNC can be realized using a direct sequence in the time or frequency domain. It is sometimes transmitted in the beginning of a frame and hence it is also known as a preamble. A SYNC may occupy only a fraction of the operation bandwidth. A SYNC can be placed at any frequency location within the operating bandwidth to facilitate the system operation. In some cases, it may be fixed at a center subband or occupy another subband within the operation bandwidth as detailed in ensuing descriptions. In one embodiment, a SYNC signal has small autocorrelation sidelobes relative to the peak of its autocorrelation and has small cross-correlation with other SYNC signals.

In other embodiments, the primary control signal further comprises a broadcasting signal that carries critical system information (e.g., system operating bandwidth, system frame number, control channel structure, and indication of usable frequency resources) over a physical broadcast channel (PBCH). A PBCH may consist of a set of contiguous subcarriers, occupying only a fraction of the operation bandwidth. A PBCH can be placed in any frequency location with the operating bandwidth to facilitate the system operation. In some cases, it may be fixed at a center subband or occupy another subband within the operation bandwidth as detailed in ensuing descriptions. Furthermore, a PBCH may occupy one or more consecutive symbols within a subframe/frame.

In further embodiments, a regular control channel comprises a plurality of subcarriers, which can be located anywhere within the operating bandwidth in the first few OFDM symbols within a subframe/frame. A regular control channel is exclusively dedicated for carrying control information. In contrast, a data channel comprises one or more time-frequency resource blocks. The resource blocks are not necessarily contiguous and can be located anywhere within the operating bandwidth. A data channel is primarily used for carrying information data; however, it may be sometimes used to carry control information.

Figure 5:
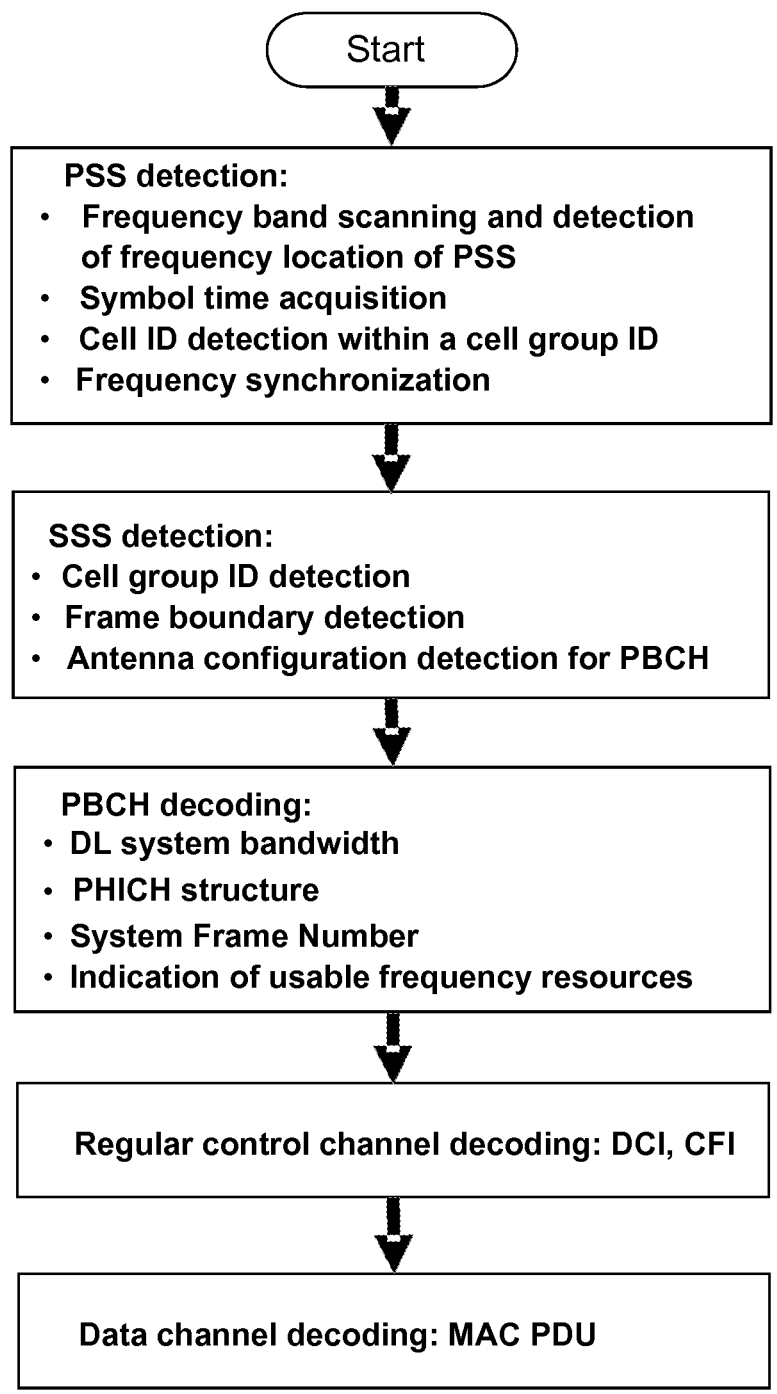
FIG. 5 is a block diagram of a typical mobile detection process in a broadband wireless communication system.

A typical mobile detection process in a broadband wireless communication system is depicted by the block diagram in FIG. 5. To start with, a mobile station scans for the signature and frequency location of a PSS over potential frequency bands. A mobile station synchronizes in time and frequency with the system by detecting the primary and secondary synchronization signals and derives essential information such as cell identity. One way to detect whether there is a synchronization signal is to correlate the signal received at the mobile with a sequence stored at the mobile station. A high peak relative to the sidelobe level in the correlation result indicates the presence of the synchronization signal. If the cell identity is embedded in the sequence, the correlation result may also reveal the cell identity. Subsequent to the detection, the mobile station may obtain critical system information such as the operating bandwidth, frame number, control channel structures, and information of usable frequency resources (subcarriers, resource blocks, macro blocks, or subbands) by decoding the signals carried in the physical broadcast channel. It then extracts control information by decoding the data carried in the regular control channels. Once the mobile station has all the necessary control information, it is enabled to carry out normal communication with its serving bastion station. In an embodiment, when a mobile station enters the network, it locks onto a frequency band according to design criteria, such as high signal power level, high signal to interference/noise ratio (SINR), low traffic load or large available capacity, usable frequency resources indicated by PBCH bit map, or a combination thereof.

In a handoff process, which is used by a mobile station to transfer an ongoing connection session from a (serving) cell to a (target) cell, a mobile station may receive a neighbor advertisement message providing proper handoff information. Such information may reduce unnecessary overhead for scanning. If a handoff decision is made, the mobile station performs functions such as time and frequency synchronization, cell identity detection, and decoding the PBCH for critical system information such as the operating bandwidth, frame number, control channel structures, and information of usable frequency resources (subcarriers, resource blocks, macro blocks, or subbands). Subsequently, the mobile station establishes the link with the target base station and then terminates the service by the original base station.

A control server may comprise components such as processors, memory banks, switches, routers, and interfaces. Together, these components enable the server to perform necessary functions such as compressing and decompressing packet headers, removing and adding packet headers, segmenting and concatenating packets, and managing databases.

Figure 6:
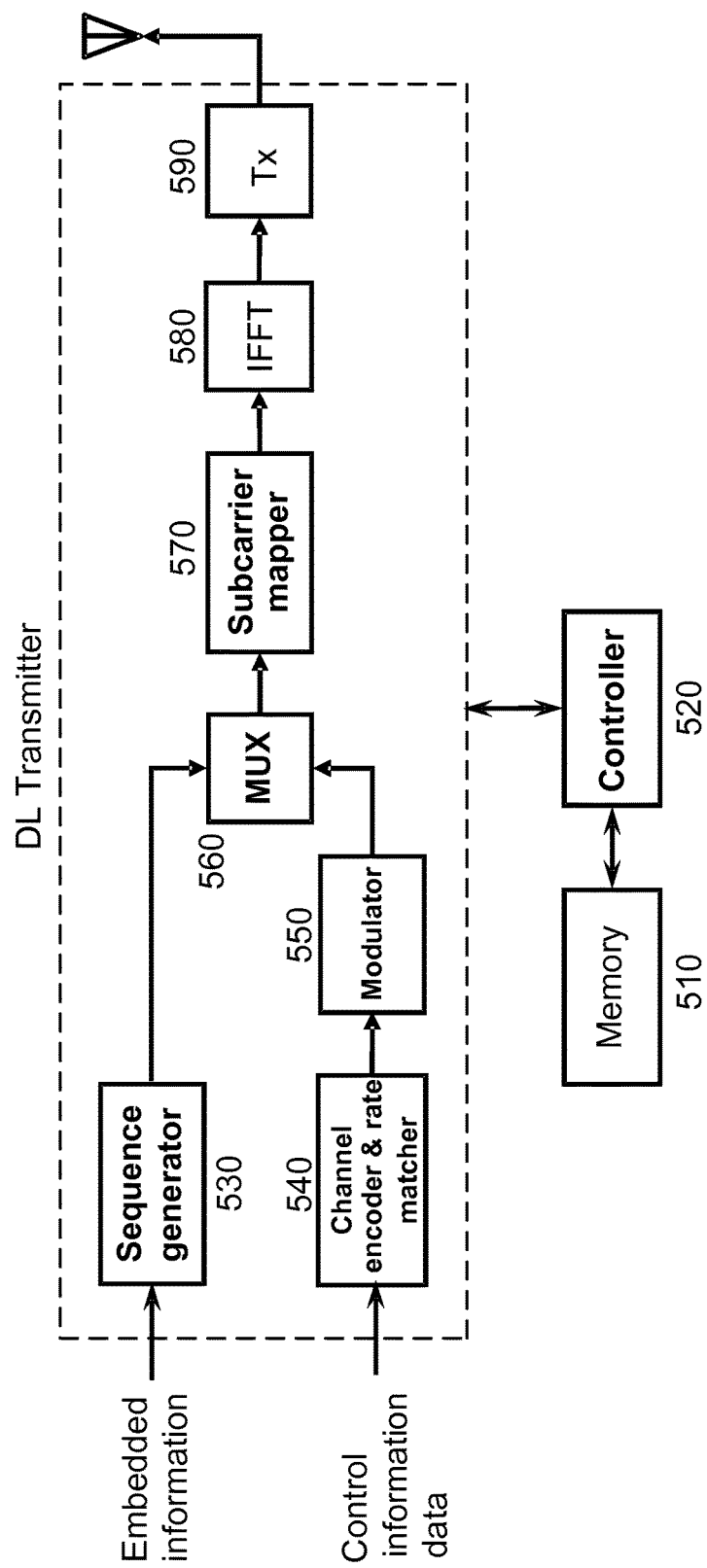
FIG. 6 is a block diagram of a representative transmitter used at the base station for transmitting a SYNC or a PBCH.

FIG. 6 is a block diagram of a representative transmitter used at the base station for transmitting a SYNC or a PBCH. The transmitter includes components such as a sequence generator, channel encoder and rate matcher, modulator, multiplexer, subcarrier mapper, inverse fast Fourier transform (IFFT), and radio frequency (RF) transmitter. In the case of SYNC transmission, information such as cell identity and timing is input to the sequence generator to be embedded in a sequence. The elements of a sequence are assigned to a set of subcarriers by the subcarrier mapper, to which the IFFT is applied, resulting in a time-domain signal to be transmitted. In the case of PBCH transmission, control information data is encoded and matched to a particular rate. The encoded data are assigned to a set of subcarriers with a particular modulation, to which the IFFT is applied, resulting in a time-domain signal to be transmitted.

A controller, coupled with memory, controls the operation of the transmitter. In particular, the controller also controls the configuration of the set of subcarriers used for SYNC or PBCH for transmission. The configuration may include frequencies and power levels.

Figure 7:
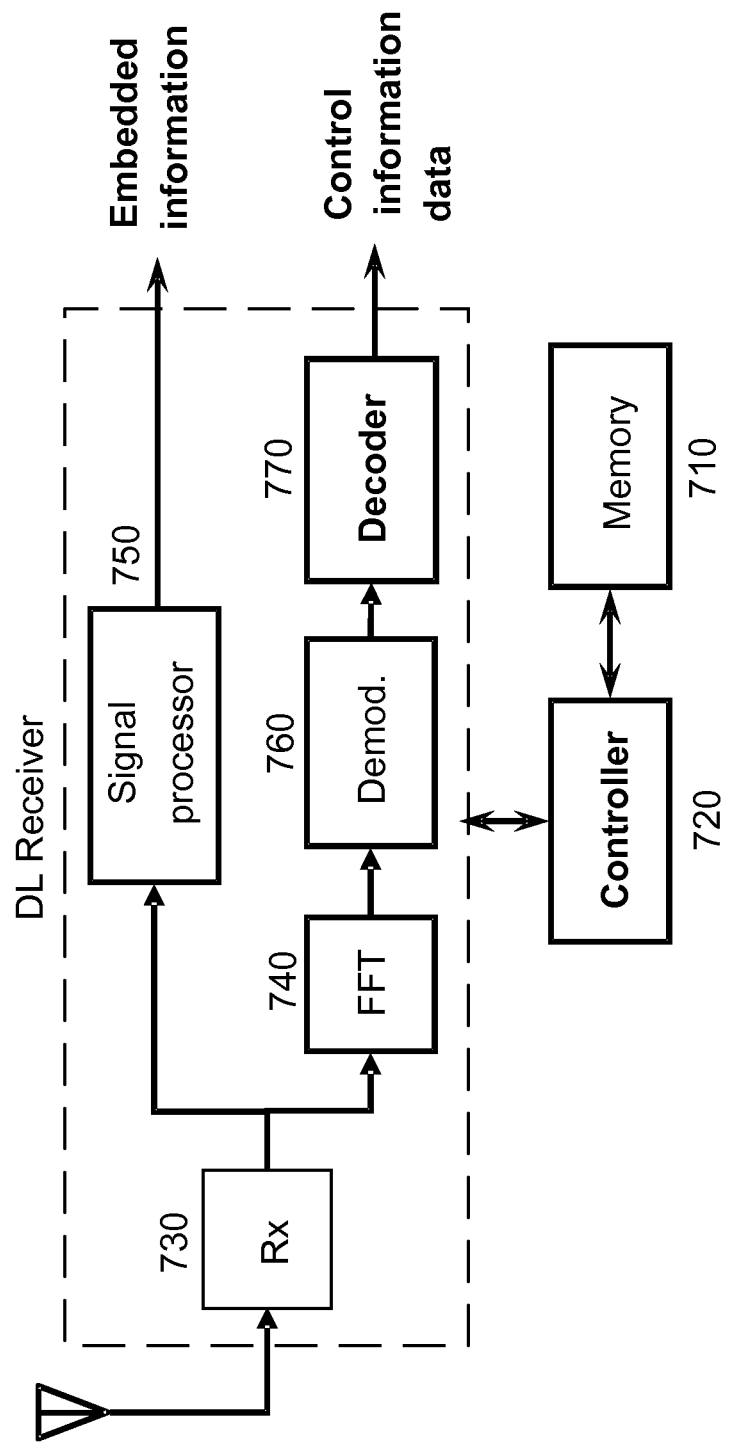
FIG. 7 is a block diagram of a representative receiver used at the mobile station for receiving a SYNC or a PBCH.

FIG. 7 is a block diagram of a representative receiver used at the mobile station for receiving a SYNC or a PBCH. The receiver includes components such as an RF receiver, signal processor, fast Fourier transform (FFT), demodulator, and decoder. In the case of SYNC reception, the received signals are input to the signal processor to be processed to extract the information embedded in the SYNC. The signal processor performs various basic mathematical functions and special signal processing functions such as low-pass filtering, band-pass filtering, transforms, matched filtering, and correlation. In the case of PBCH reception, an FFT is applied to the received signals. The subcarriers corresponding to the PBCH are demodulated and decoded to recover the control information data.

A controller, coupled with memory, controls the operation of the receiver. In particular, the controller also controls the configuration of the set of subcarriers used for SYNC or PBCH for reception.

Those skilled in the art will appreciate that these components construct, transmit, and receive a communication signal containing the data. Other forms of transmitters or receivers may, of course, be used depending on the requirements of the communication system.

In accordance with aspects of certain embodiments of the present invention, in a broadband wireless communication system, a primary control signal can be relocated within the operation band for transmission while avoiding interference. For example, if the primary control signal employs P contiguous subcarriers, it can be placed in any section of the band that has P contiguous subcarriers. If a narrow-band interferer appears at one end of the band, the primary control signals can be placed at the other end. If the interferer appears in the middle, the primary control signals can be relocated to either end of the band or each of the primary control signals can be divided into two portions, each portion relocated at one end of the band. The placement of primary control signals can be changed as the interference environment changes; that is, the relocation of a primary control signal can be adaptive to interference environment.

In one embodiment, the frequency location of the channel that carries a primary control signal varies within the operating bandwidth in different cells or geo-locations in the system. In another embodiment, such position variation of primary control channels depends at least in part on the variation of interference (such as the strength and frequency location) in the cells. The interference may comprise inter-system interference from, e.g., TV broadcasting signals, or intra-system interference from other cells.

Figure 8:
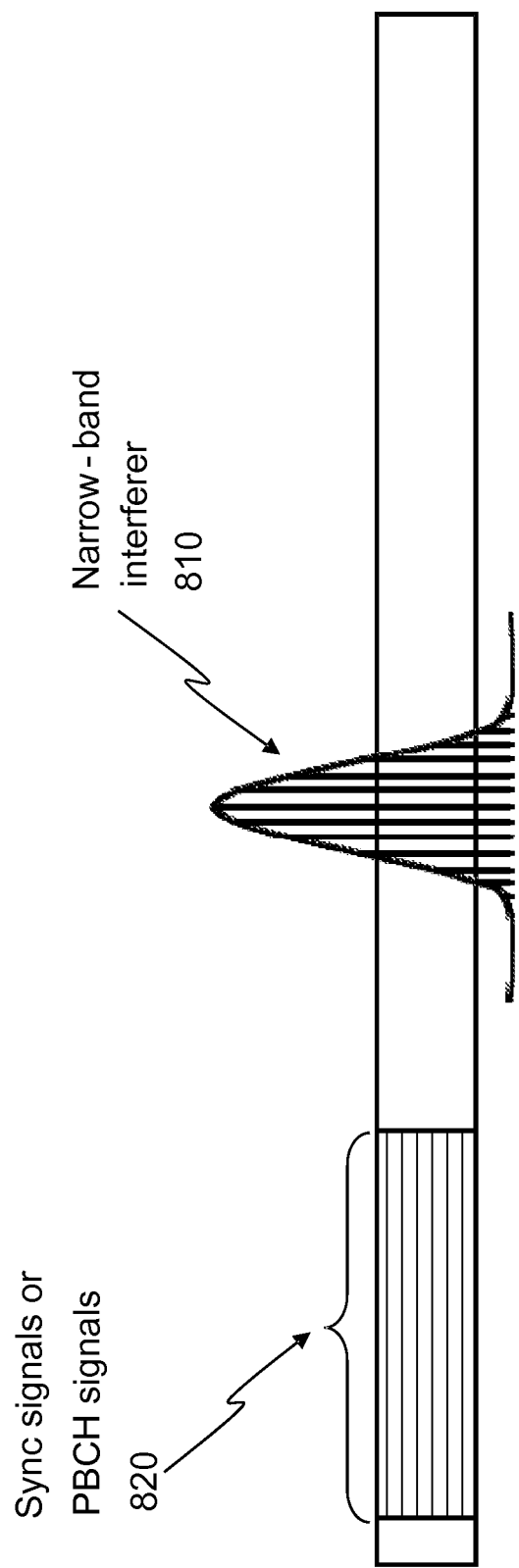
FIG. 8 is graphical depictions of a primary control signal relocated to avoid interference.

In some embodiments, a primary control signal can be relocated in such a way that its center subcarrier can be placed at any point within the operation band to avoid interference, as depicted in FIG. 8. For example, in a system with a total of Q usable subcarriers within its bandwidth, which are labeled by $$\left\{-\frac{Q}{2}, -\frac{Q}{2}+1, \ldots, -1, 0, 1, \ldots \frac{Q}{2}-1\right\}$$

and Q is an even number, the center subcarrier of a primary control signal with P subcarriers can be placed at the frequency location (subcarrier index) $f_c$, where $$-\frac{Q}{2} + \left\lfloor \frac{P}{2} \right\rfloor < f_c < \frac{Q}{2} - \left\lfloor \frac{P}{2} \right\rfloor$$

where $\lfloor \bullet \rfloor$ represents the floor function or greatest integer operator. Guard subcarriers (zero energy) may be placed on both sides of the primary control signal. In this case, if a total of S guard subcarriers are used, then $$-\frac{Q}{2} + \left\lfloor \frac{P+S}{2} \right\rfloor < f_c < \frac{Q}{2} - \left\lfloor \frac{P+S}{2} \right\rfloor$$

In one embodiment, the center subcarrier of a primary control signal may only be placed at a frequency location that is related to the system parameters (e.g., clock rate, sampling rate, and subcarrier spacing) or simply a predetermined frequency location. For example, the center subcarrier of a primary control channel is placed at a position in the frequency grids that are (positive and negative) multiples of a system sampling rate/clock rate, a (positive and negative) fraction of the sampling rate/clock rate, or (positive and negative) multiples of a subcarrier spacing. For instance, the center frequency of a primary control channel can be placed at ±3.84n MHz, where n is an integer. For further example, the center subcarrier of a SYNC is placed at one of the frequency locations $f_c=\{0, \pm L_{sync}, \pm 2L_{sync}, \pm 3L_{sync}, \ldots\}$, where $L_{sync}$ denotes the length of the SYNC sequence.

Figure 9:
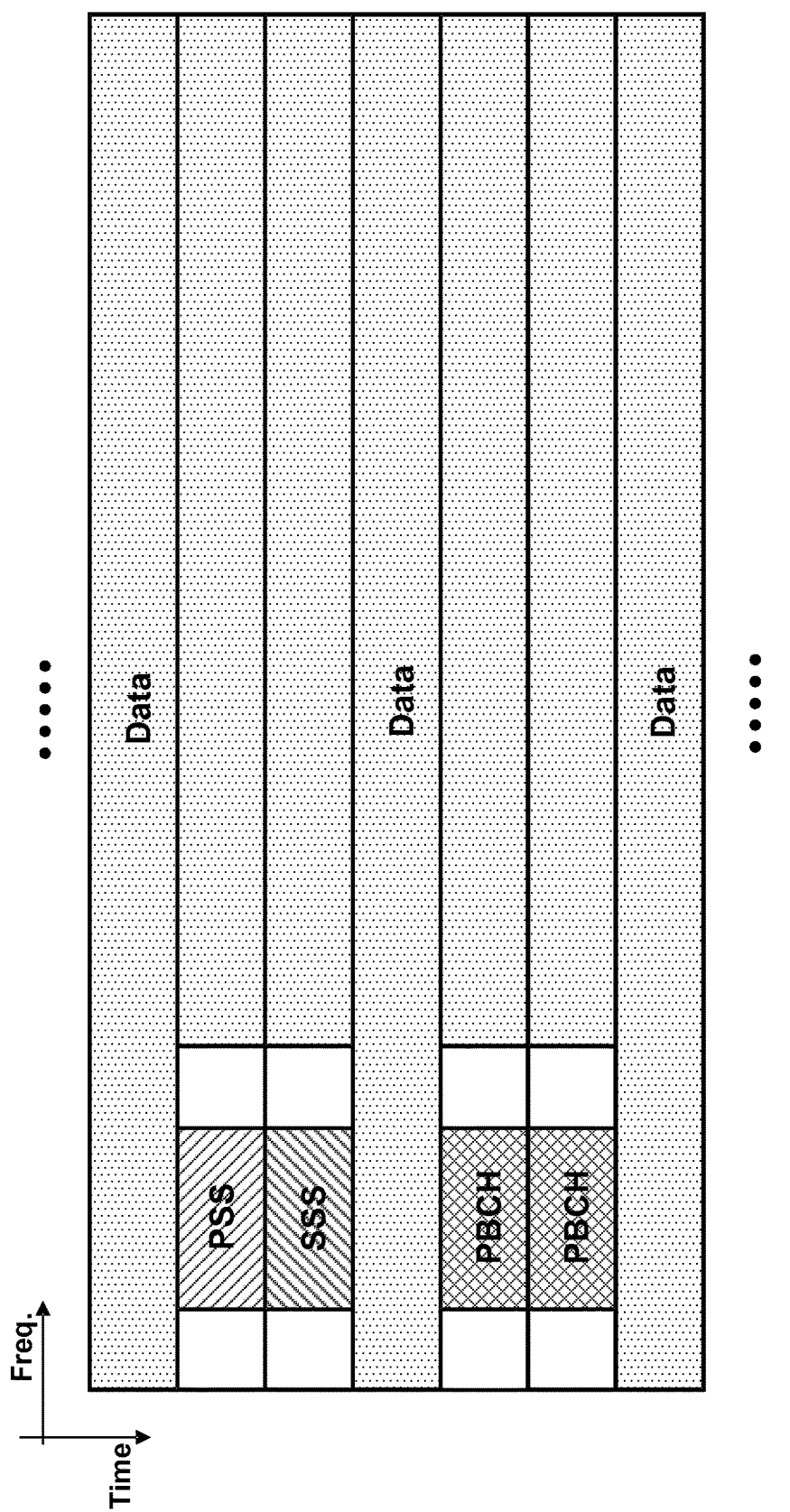
FIG. 9 is graphical depictions of PSS, SSS, and PBCH aligned in frequency.

In other embodiments, multiple primary control signals may occupy the same frequency section in different OFDM symbols; that is, their center subcarrier corresponds to the same subcarrier index. In an example shown in FIG. 9, PSS, SSS, and PBCH are aligned in frequency but placed in different OFDM symbols.

In further embodiments, a primary control signal may be relocated at a frequency location with a sufficient level of channel quality (e.g., sufficiently high mean SNR or sufficiently low average level of interference) for mobile station to detect the primary control signal. The channel quality can be determined using various methods. In one embodiment, mobile stations may survey the channel quality, based in part on DL signals from their serving base stations, and feed the relevant information back to their serving base stations, which then aggregate the information to determine the frequency location with a sufficient level of channel quality. In another embodiment, base stations may survey the channel quality, based in part on UL signals from their mobile stations, and determine the frequency location with sufficient channel quality.

In other embodiments, the transmission of primary control signals may hop in frequency from one subframe, slot, or frame to the next. The hopping pattern can be pseudo-random. The hopping pattern in frequency can be predetermined and made known to both base stations and mobile stations explicitly or implicitly. The information about the hopping pattern can also be embedded in the primary control signals. For example, information embedded in the current SYNC indicates the subcarrier index q for the SYNC in next subframe, slot, or frame.

Figure 10:
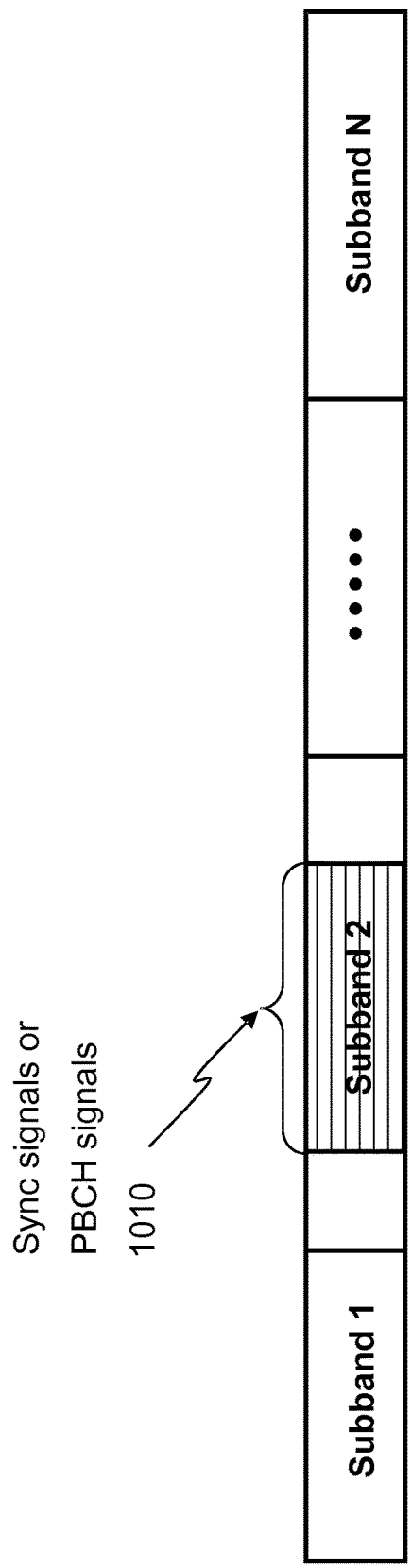
FIG. 10 is a graphical depiction of non-overlap subbands in frequency.

In some embodiments, the OFDM symbol that is used to transmit a primary control signal or primary control signals may be divided into multiple (N) non-overlapping subbands in frequency, as depicted in FIG. 10. The width of each subband is not necessarily equal, but may be sufficiently wide for a primary control signal. A primary control signal may occupy the entire subband or a section of the subband. In the latter case, the primary control signal is not necessarily centered on the subband. Guard subcarriers (zero energy) may be placed on both sides of the primary control signal.

Figure 11:
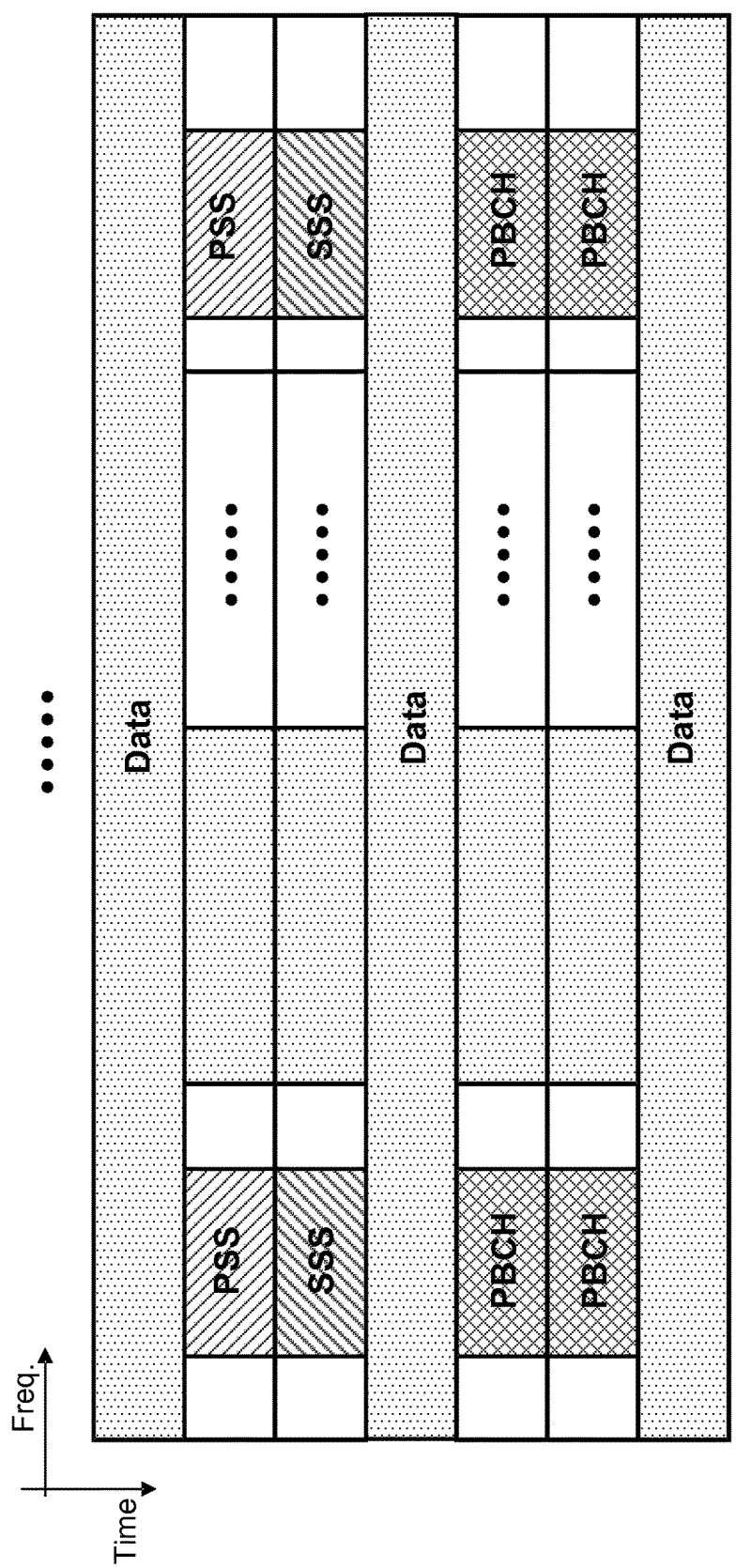
FIG. 11 is a graphical depiction of multiple PSS, SSS, and PBCH being transmitted using a set of subbands.

In other embodiments, multiple primary control signals can be transmitted in different subbands at the same time or in the same OFDM symbol. In the example depicted in FIG. 11, multiple PSS may be transmitted using a set of subbands. In the next OFDM symbol, multiple SSS may be transmitted using the same set of subbands. Furthermore, multiple PBCH may be transmitted using the same set of subbands in other OFDM symbols. In the event that the same primary control signals are transmitted using multiple subbands in the same OFDM symbols, the received signals over these subbands can be combined in the frequency domain at the receiver using a specific combining technique (e.g., Maximum Ratio Combining) to process primary control signal.

Various subband configurations can be employed for transmission. In some embodiments, subbands may be assigned a priority for transmission of primary control signals so that a mobile may carry out search over the high-priority subbands first. The priority order can be predetermined and made known to both base stations and mobile stations. The priority order can be pseudo-random or follow a natural pattern. For example, subband priority may descend from center to either end of the operation band. A mobile station may search a primary control signal over the center subband first and if it fails to find the primary control signal, it may then search over the subbands next to the center subband.

In other embodiments, a subband with a sufficient level of channel quality (e.g., sufficiently high mean SNR or sufficiently low average level of interference) may be selected for primary control signal transmission. Subband channel quality can be determined using various methods. For example, in a FDD system, mobile stations may survey the channel quality of different subbands based on DL signals from their serving base stations and feed the relevant information back to their serving base stations, which then aggregate the information to determine the subbands with a sufficient level of channel quality. In a TDD system, base stations may survey the channel quality of different subbands based on UL signals from their mobile stations and determine the subbands with the a sufficient level of channel quality.

In further embodiments, primary control signals may be transmitted over subband i in a subframe (or slot or frame) and over subband j in the next subframe (slot or frame); that is, the transmission of primary control signals hops from one subband to the other over time. The hopping pattern can be pseudo-random or follow a natural pattern (e.g., round robin). The hopping pattern can be predetermined and made known to both base stations and mobile stations explicitly or implicitly. The information about the hopping pattern can also be embedded in the primary control signals. For example, information embedded in the current SYNC indicates which subband the next SYNC will be transmitted over. Alternatively, a mobile station can carry out blind detection of the primary control signal.

A SYNC is a sequence in either time or frequency domain. System information can be embedded in the sequence. In particular, the $n^{th}$ element of the sequence can be expressed as a function of $$d(n)=f(n, I_{cell}, I_{subf}, q)$$

where $I_{cell}$ denotes the cell identity, $I_{subf}$ denotes the subframe index, and q denotes the subcarrier index for the center subcarrier of the SYNC.

Figure 12:
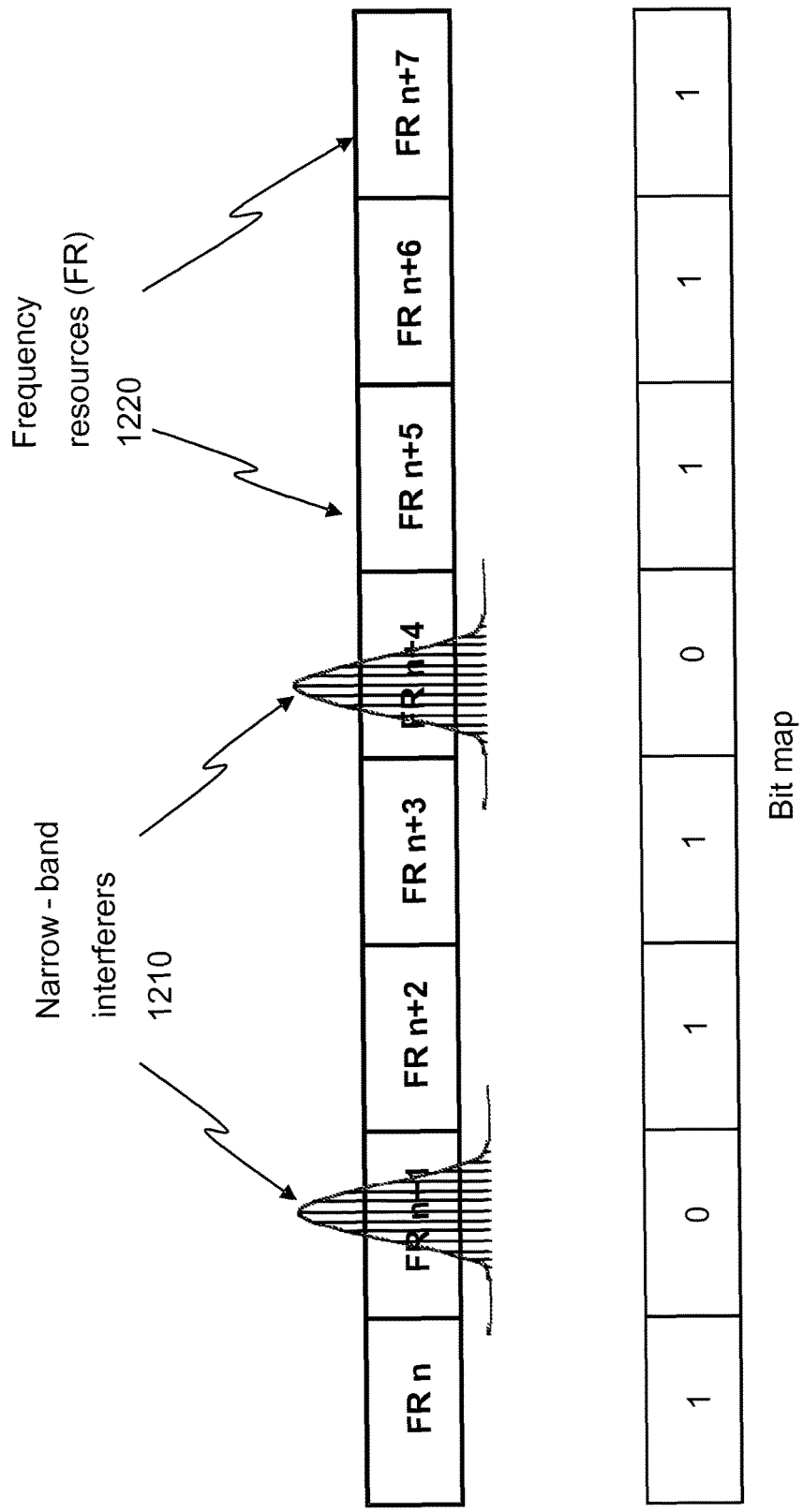
FIG. 12 is a graphical depiction of a bitmap that is used to indicate which frequency resources are usable or unusable.

A PBCH carries system control information. In some embodiments, PBCH may also used to carry information to indicate usable (or unusable) frequency resources within the operation band. Frequency resources may be organized as subcarriers, Resource Blocks (RB) of subcarriers, macro RB's, or subbands. In an embodiment, a PBCH may contain a bitmap that is used to indicate which frequency resources are usable or unusable, with bit value 1 signifying usable and 0 signifying unusable as depicted in FIG. 12. Such a bitmap can be further compressed using a particular compressing method (e.g., run-length coding). Two bitmaps may be used: one for DL and the other for UL. In another embodiment, the PBCH may contain two bit-fields that are used to indicate the unusable frequency resources: one denoting the starting subcarrier (or block) index and the other denoting the ending subcarrier (or block).

To reduce overhead for indicating frequency resources within an operating bandwidth, the system may define a frequency resource unit of large granularity (e.g., a macro RB (MRB)) that contains a plurality of consecutive frequency resource units of smaller granularity (e.g., RB's) and a message/bitmap in the PBCH may indicate the usable/unusable units of large granularity, instead of units of smaller granularity.

In other embodiments, regular control channels may be used to carry information to indicate usable (or unusable)

frequency resources within the operating band. A regular control channel may contain downlink control information indicating the scheduled frequency resources for downlink data transmission. Another regular control channel may contain additional control information indicating the scheduled frequency resources for uplink data transmission. In the control signals/messages, the scheduled frequency resources (subcarriers, RB's, MRB's, or subbands) for downlink or uplink transmission may only include the usable the usable frequency resources, which may be addressed or indexed as if the operation band is contiguous with only usable frequency resources.

An indication of usable (unusable) frequency resources allow mobile stations to measure channel quality indications such as power level or signal-to-interference-plus-noise ratio (SINR) over the usable frequency resources. In addition, mobile stations may use the received signals within usable frequency resources for signal processing such as frequency offset estimation. However, a base station or the system may signal, via a PBCH, a regular control channel, or a control message in a data channel, a mobile station to monitor and measure the channel quality of the unusable frequency resources. A mobile station may also elect to monitor and measure the channel quality of unused frequency resources as indicated by PBCH. The mobile station may then feed the channel quality information back to the base station so that the base station or system can make further decisions on the quality/usability of these frequency resources.

In some embodiments, the control server may determine center frequencies or assigns subband for primary control signals based on the available interference information. The interference information can be obtained using different methods. In an embodiment, mobile stations may detect and measure interference that they experience, and send the interference information (e.g., its relative or absolute strength, its location in frequency, and its bandwidth) to their serving base stations. In another embodiment, the interference information may be derived from a database that is maintained by the system. The database may contain geolocations, frequencies, and power levels of broadcast transmitters (e.g., high-power TV stations). The database may also contain interference information including frequency location and the strength of the interference in one or more cells and in the vicinity of the network generating through site surveys. A control server or a base station may consult with the database so that it can determine a center frequency or subband for transmitting a primary control signal in order to avoid strong interference from inter-system interferers. In addition, the server may coordinate the use of center frequencies or subbands by allocating a set of center frequencies or subbands to a cell for primary control signals and a different set to its neighboring cell. Alternatively, base stations of neighboring cells exchange, via a backbone network (e.g., X2 Interface), the information on center frequencies or subbands they intend to use for their primary control signals. For example, base stations of neighboring cells exchange the SYNC and PBCH information (e.g., the time and/or frequency locations) and/or channels and information about usable/unusable frequency resources (e.g., subcarriers, RB's, MRB's, or subbands) for data or control channels/signals within the operation bandwidth through backbone network (e.g., X2 Interface). In addition to exchanging aforementioned information, base stations of neighboring cells may send advertisement messages about part or all of the aforementioned information to each other, which then advertise the information regarding their neighbors to expedite mobile station handoff, thereby reducing unnecessary overhead for scanning in cell reselection.

In other embodiments, a base station may avoid using frequency resources under severe interference for transmission of DL control channels (e.g., Physical Control Format Indicator Channel, Physical Dedicated Control Channel, and Physical Hybrid ARQ Indicator Channel) and data channels. Similarly, mobile stations, based on the information disseminated on the PBCH (e.g., the bitmaps or bit fields) indicating the usable or unusable frequency resources, may carry out detection of DL regular control channels and data channels over the usable frequency resources. A base station may make a determination to transmit reference signals in unused frequency resources. For example, the base station may choose to transmit reference signals within unused frequency resources for the use by mobiles (e.g., SNR estimation) or not to transmit reference signals within unused frequency resources. Similarly, a mobile station may choose to use the reference signals within unused frequency resources or not to. Furthermore, base stations may make frequency resources under severe interference unavailable for the use of random access by mobile stations.

In further embodiments, base stations of cells in a single frequency network (SFN) may only transmit SFN signals using the usable frequency resources that are common to these cells. These base stations may send, via a backbone network, the information on the usable frequency resources in their own cells to a server and the server may determine the commonly usable frequency resources for SFN transmission among these cells. The base stations may also exchange, via a backbone network, the information on the usable frequency resources in their own cells and determine among themselves the commonly usable frequency resources for SFN transmission. The frequency resources usable in a specific cell but not usable in other SFN cells may be used for cell specific transmission in that cell, such as cell-specific retransmission of the SFN signal. A base station may use a signaling method (e.g., a bitmap) on a PBCH or other regular control channels to indicate unusable frequency resources, cell-specific frequency resources, or SFN frequency resources. Correspondingly, mobile stations may use the appropriate signal detection and processing method to deal with the SFN frequency resources and cell-specific frequency resources.

A primary control signal may carry timing, frequency, location, system parameter information, which enables a mobile station to find the base station of the cell it is in, to synchronize with the network, and to access the network. In cell search procedures or cell reselection procedures for handoff, one of the steps is to detect the SYNC. In the event that there are PSS and SSS, a mobile station may detect PSS first and then SSS.

Figure 13:
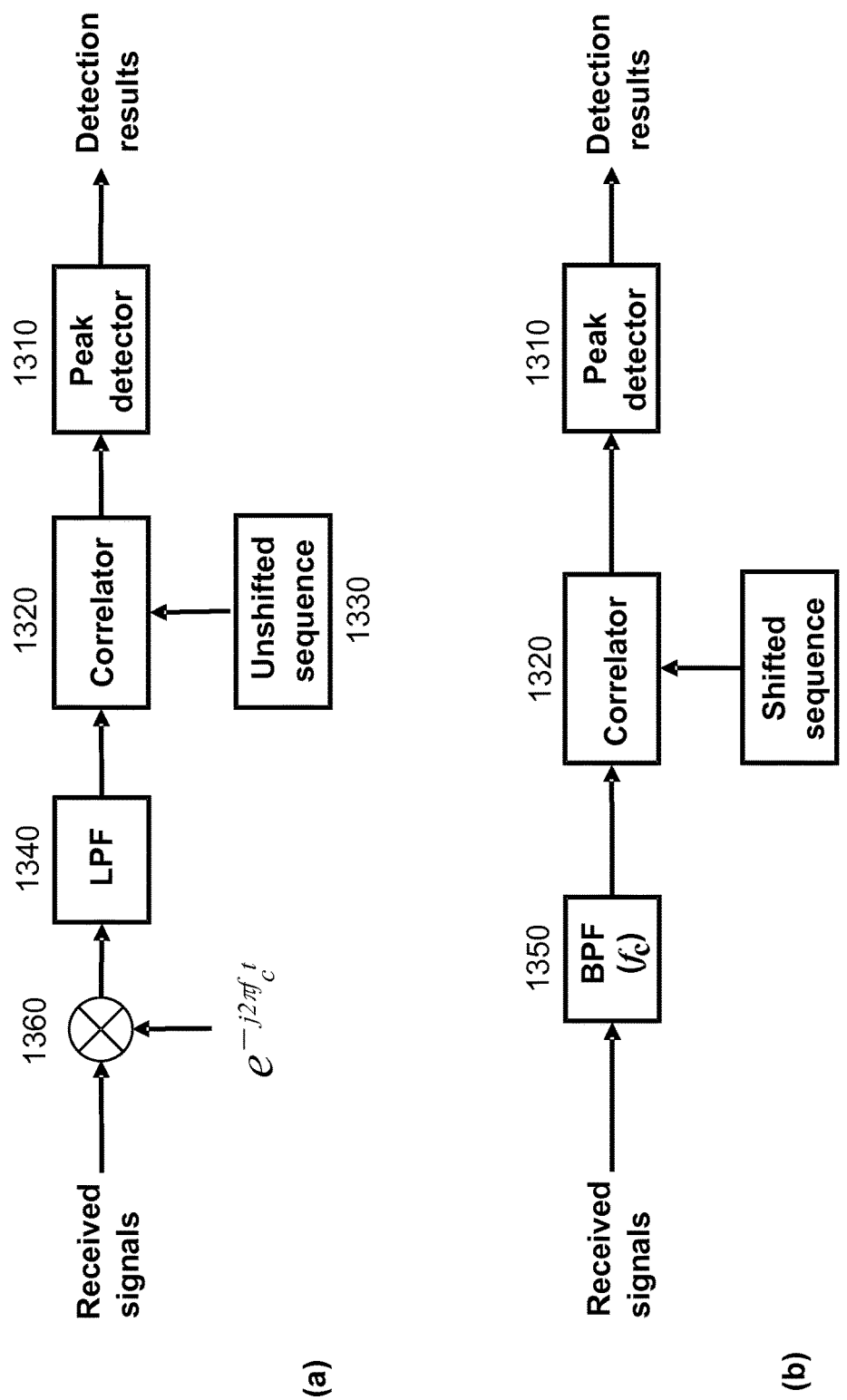
FIG. 13 is a block diagram of representative receiving processes for detection of a SYNC.

In some embodiments, the signal processor may process the received signals with the following process, as shown in FIG. 13(a):
 1. Frequency shift: the received signal is shifted in frequency to multiplying a time varying complex factor $e^{-j2\pi f_c t}$, where $f_c$ is the possible frequency location of the center subcarrier of the SYNC.
 2. Low-pass filtering: A low-pass filter (LPF) is applied to the frequency-shifted signals, where the bandwidth of the filter corresponds to the bandwidth of the SYNC signal.
 3. Correlation: Correlation is carried out between the filtered signals and the time-domain sequence of the SYNC with its center subcarrier at DC (direct current), which is called unshifted sequence here.

4. Peak detection: A peak detector is used to determine if a SYNC is detected.

In other embodiments, the signal processor may process the received signals with the following process, as shown in FIG. 13(b):
1. Band-pass filtering: A band-pass filter (BPF) is applied to the received signals, where the bandwidth of the filter corresponds to the bandwidth of the SYNC signal and the center of the pass band is the possible frequency location of the center subcarrier of the SYNC, $f_c$.
2. Correlation: Correlation is carried out between the filter signals and the time-domain sequence of the SYNC with its center subcarrier at $f_c$, which is called shifted sequence here.
3. Peak detection: A peak detector is used to determine if a SYNC is detected.

Figure 14:
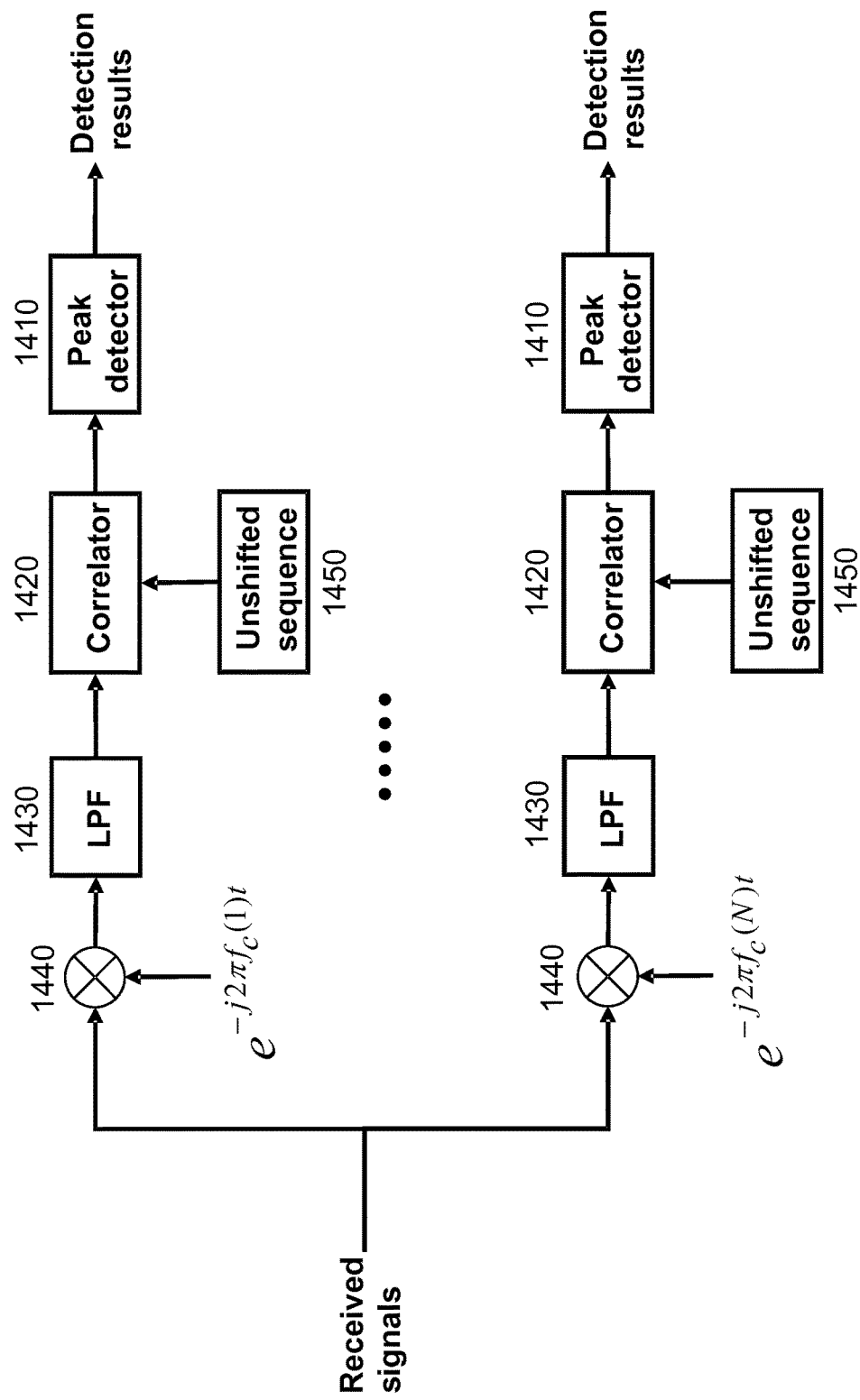
FIG. 14 is a block diagram of another representative receiving process for detection of a SYNC.

If $f_c$ is known to the mobile station, either process may be repeated until a SYNC is detected. If $f_c$ is unknown to the mobile, either process can be repeated sequentially for each possible center subcarrier location $f_c$ until a SYNC is detected. Alternatively, either process can be carried out concurrently for all possible center subcarrier locations; that is, there are multiple (N) parallel paths for detecting the SYNC, each one for a possible center subcarrier location $f_c(n)$, as shown in FIG. 14.

The above processes can be implemented using software, firmware, or hardware.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes are presented in a given order, alternative embodiments may perform routines having steps in a different order, and some processes may be deleted, moved, added, subdivided, combined, and/or modified to provide alternative or subcombinations. Each of these processes may be implemented in a variety of different ways. Further any specific numbers noted herein are only examples: alternative implementations may employ differing values or ranges.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

Figure 15:
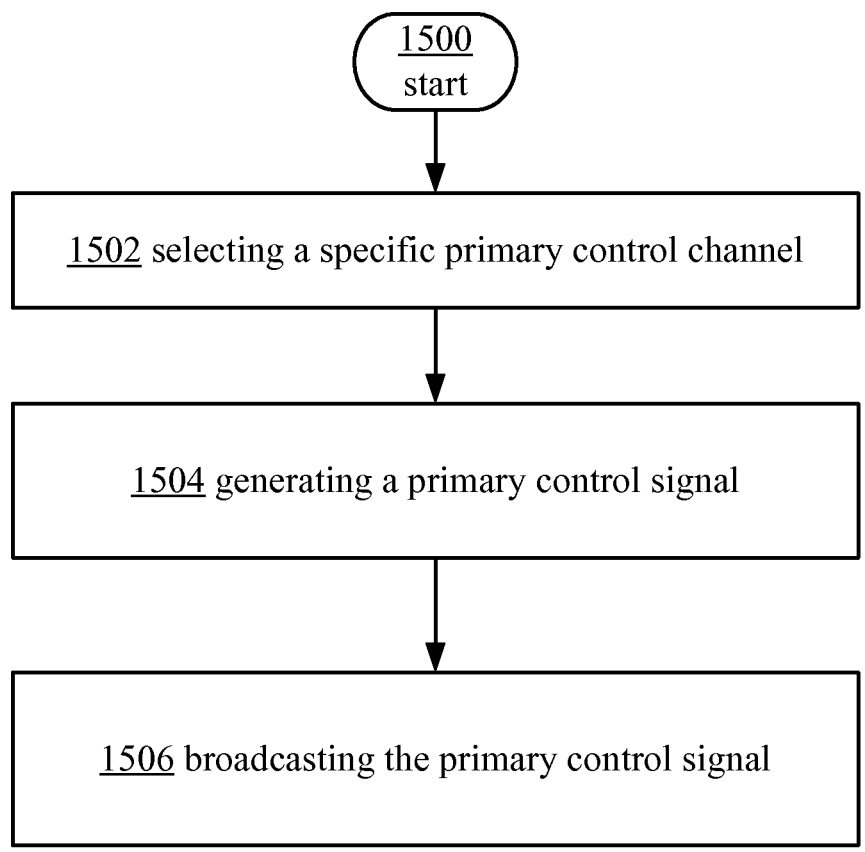
FIG. 15 illustrates an example of an operational procedure for practicing aspects of the present disclosure.

FIG. 15 depicts an exemplary operational procedure for communication via an operating frequency channel by a base station in a multi-carrier communications system including operations 1500, 1502, and 1504. In one embodiment, the multi-carrier communications system comprises a plurality of base stations and mobile stations, the base station serving a cell among a plurality of cells.

Referring to FIG. 15, operation 1500 begins the operational procedure and in operation 1502 a specific primary control channel selected. In one embodiment, the specific primary control channel is selected from among multiple primary control channels at distinct center frequency locations within the operating frequency channel. In some embodiments, each of the multiple primary control channels is characterized by being capable of carrying a primary control signal, having a number of contiguous subcarriers, and having a bandwidth substantially narrower than a bandwidth of the operating frequency channel. Additionally and optionally, the specific primary control channel is different from at least one of the multiple primary control channels selected by at least one other base station in the system.

In operation 1504, a primary control signal is generated. In one embodiment, the primary control signal is generated by modulating a sequence on subcarriers of the specific primary control channel. In some embodiments, the sequence has an autocorrelation with a high correlation peak with respect to sidelobes. Furthermore, the sequence may contain information on cell identity. Additionally and optionally, the primary control signal has a small peak-to-average power ratio.

In operation 1506, the primary control signal is broadcasted to mobile stations within the cell.

In some embodiments, the specific primary control signal enables a mobile station within the cell to perform initial synchronization with the base station in time or frequency.

In one embodiment, the specific primary control signal is modulated in an orthogonal frequency division multiplexing (OFDM) symbol.

In an embodiment, the sequence is a binary sequence. In other embodiments, the sequence is a non-binary sequence. In further embodiments, the sequence is a Zadoff-Chu sequence.

In one embodiment, the primary control signal has a small peak-to-average power ratio in the time domain.

In some embodiments, information of the center frequency location of the specific primary control channel is sent to other base stations in the system via a network connecting the plurality of base stations.

In some embodiments, the base station broadcasts to mobile stations within the cell the frequency locations of the primary control channels used in other cells in the system.

In some embodiments, a control signal is broadcast, indicating frequency resources usable for communication between the base station and mobile stations within the cell.

In some embodiments, a bitmap is used to indicate usable subbands within the operating frequency channel.

In some embodiments, the selection of the specific primary control channel is based on operational conditions of the multiple primary control channels. The operational conditions may be related to interference level or signal-to-noise ratio. In other embodiments, the selection of the specific primary control channel varies from one subframe, slot, or frame to the next. In some embodiments, the selection of the specific primary control channel is based on a frequency usage schedule.

In some embodiments, another primary control signal is transmitted on another primary control channel.

In some embodiments, another specific primary control channel is selected from among the multiple primary control channels, another primary control signal is generated by modulating another sequence on subcarriers of the another specific primary control channel, and this primary control signal is broadcast to the mobile stations within the cell.

Figure 16:
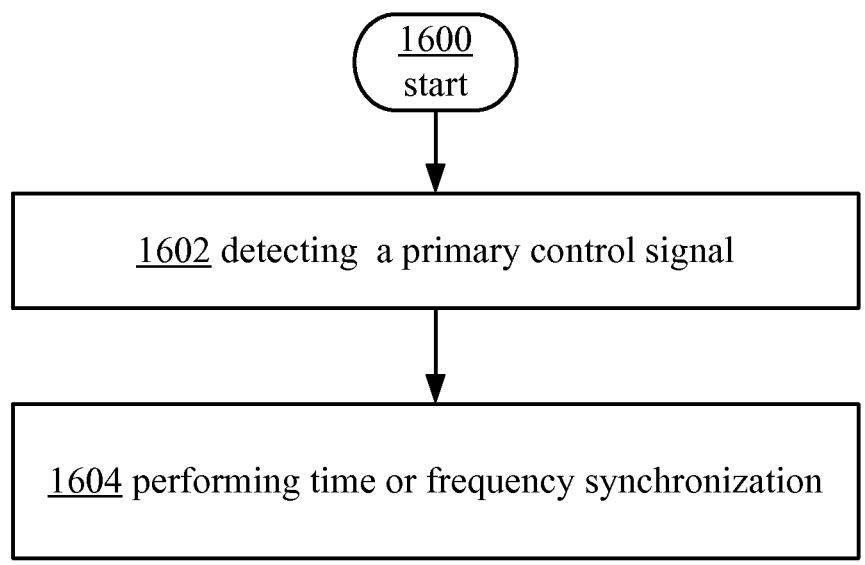
FIG. 16 illustrates an example of an operational procedure for practicing aspects of the present disclosure.

FIG. 16 depicts an exemplary operational procedure for communication via an operating frequency channel by a mobile station in a multi-carrier communications system comprising a plurality of base stations and mobile stations including operations 1600, 1602, and 1604.

Referring to FIG. 16, operation 1600 begins the operational procedure and in operation 1602 detecting a primary control signal transmitted from a base station serving a cell in the system. In one embodiment, this is done by searching over multiple primary control channels at distinct center frequency locations within the operating frequency channel. In one embodiment, each of the multiple primary control channels is characterized as having a number of contiguous subcarriers and a bandwidth substantially narrower than a bandwidth of the operating frequency channel. In another embodiment, the primary control signal comprises a sequence modulating on subcarriers of a primary control channel. Furthermore, the sequence may have an autocorrelation with a large correlation peak with respect to sidelobes. Additionally and optionally, the sequence may contain cell identity information. In some embodiments, the primary control signal may have a small peak-to-average power ratio.

In operation 1604, time or frequency synchronization is performed based on the detected primary control signal.

In one embodiment, a correlation is performed between the received signal and a sequence stored at the mobile device. In an embodiment, symbol time acquisition is performed. In another embodiment, cell identity detection is performed. In another embodiment, frame boundary detection is performed. In another embodiment, information decoding is performed on a physical broadcasting channel (PBCH).

In one embodiment, an interference measurement is performed. In another embodiment, a neighbor advertisement message is received containing information on center frequency locations of primary control channels used in neighboring cells. In another embodiment, a handover procedure is performed.

Any of the above mentioned aspects can be implemented in methods, systems, computer readable media, or any type of manufacture. For example, a computer readable medium can store thereon computer executable instructions for communicating in a wireless communications system.

Lastly, while the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for communication by a base station in an Orthogonal Frequency Division Multiple Access (OFDMA) communications system comprising a plurality of base stations and mobile stations, the base station serving a cell among a plurality of cells using a frame structure comprising multiple frames, a frame comprising a plurality of subframes, and a subframe comprising a plurality of orthogonal frequency division multiplexing (OFDM) symbols, the method comprising:

operating in a plurality of noncontiguous frequency subbands usable for simultaneously transmitting data to a mobile station communicatively coupled to the cell, at least one of the plurality of frequency subbands being unlicensed, wherein each of the plurality of frequency subbands is capable of carrying:
  a primary control signal via one or more OFDM symbols in at least one subframe in a frame;
determining a frequency subband of the plurality of frequency subbands having a sufficient level of channel quality for transmitting data; and
assigning a predetermined priority to the frequency subband and transmitting the primary control signal over the frequency subband, the predetermined priority being usable by the mobile station to access the frequency subband.

2. The method in claim 1, wherein the primary control signal is a primary synchronization signal (PSS) or a secondary synchronization signal (SSS).

3. The method in claim 2, wherein the PSS or SSS is generated by modulating a sequence on a set of contiguous subcarriers, wherein:
the sequence has an autocorrelation with a large correlation peak with respect to sidelobes;
the sequence contains information on a cell identity; and
the PSS or SSS has a small peak-to-average power ratio.

4. The method in claim 1, wherein the primary control signal is a physical broadcast channel (PBCH) carrying encoded data of essential system information.

5. The method of claim 4, wherein the PBCH is generated by modulating the encoded data on a set of contiguous subcarriers.

6. The method in claim 1, wherein the primary control signal occupies a section of a frequency subband in frequency.

7. The method in claim 1, wherein a measure of the sufficient level of channel quality is a sufficiently low average level of interference.

8. The method in claim 1, wherein interference in the unlicensed frequency subband comprises inter-system interference.

9. A base station in an Orthogonal Frequency Division Multiple Access (OFDMA) communications system comprising a plurality of base stations and mobile stations, the base station serving a cell among a plurality of cells using a frame structure comprising multiple frames, a frame comprising a plurality of subframes and a subframe comprising a plurality of orthogonal frequency division multiplexing (OFDM) symbols, the base station comprising:

a facility configured to operate in a plurality of noncontiguous frequency subbands usable for simultaneously transmitting data to a mobile station in communication with the cell, at least one of the plurality of frequency subbands being unlicensed, wherein the plurality of frequency subbands are configured to carry:
  a primary control signal via one or more OFDM symbols in at least one subframe in a frame; and
a processor configured:
  to determine a frequency subband of the plurality of frequency subbands having a sufficient level of channel quality for transmitting data; and
  assign a predetermined priority to the frequency subband and transmitting the primary control signal over the frequency subband, the predetermined priority being usable by the mobile station to access the frequency subband.

10. The base station of claim 9, wherein interference in the unlicensed frequency subband comprises inter-system interference.

11. A method for communication by a mobile device served by a base station in an Orthogonal Frequency Division Multiple Access (OFDMA) communications system using a frame structure of multiple frames, a frame comprising a plurality of subframes and a subframe comprising a plurality of orthogonal frequency division multiplexing (OFDM) symbols, the method comprising:
operating in a plurality of noncontiguous frequency subbands usable for simultaneously receiving data from the base station, at least one of the plurality of frequency subbands being unlicensed, wherein each of the plurality of frequency subbands is capable of carrying:
a primary control signal via one or more OFDM symbols in at least one subframe in a frame; and
receiving the primary control signal over a specific frequency subband for access by the mobile device to the frequency subband, wherein the specific frequency subband was determined as having a sufficient level of channel quality for transmitting data and assigned a predetermined priority by the base station, the predetermined priority being usable by the mobile device to access the frequency subband.

12. The method in claim 11, wherein the primary control signal is a primary synchronization signal (PSS) or a secondary synchronization signal (SSS).

13. The method in claim 12, wherein the PSS or SSS is generated by modulating a sequence on a set of contiguous subcarriers, wherein:
the sequence has an autocorrelation with a large correlation peak with respect to sidelobes;
the sequence contains information on a cell identity; and
the PSS or SSS has a small peak-to-average power ratio.

14. The method in claim 11, wherein the primary control signal is a physical broadcast channel (PBCH) carrying encoded data of essential system information.

15. The method of claim 14, wherein the PBCH is generated by modulating the encoded data on a set of contiguous subcarriers.

16. The method in claim 11, wherein the primary control signal occupies a section of a frequency subband in frequency.

17. The method in claim 11, wherein a measure of the sufficient level of channel quality is a sufficiently low average level of interference.

18. A mobile device served by a base station in an Orthogonal Frequency Division Multiple Access (OFDMA) communications system using a frame structure comprising multiple frames, a frame comprising a plurality of subframes and a subframe comprising a plurality of orthogonal frequency division multiplexing (OFDM) symbols, the mobile device configured to:
operate in a plurality of noncontiguous frequency subbands usable for simultaneously receiving data from the base station, at least one of the plurality of frequency subbands being unlicensed, wherein each of the plurality of frequency subbands is capable of carrying:
a primary control signal via one or more OFDM symbols in at least one subframe in a frame; and
the mobile device comprising a receiver configured to receive the primary control signal over a specific frequency subband for access by the mobile device to the frequency subband, wherein the specific frequency subband was determined as having a sufficient level of channel quality for transmitting data and assigned a predetermined priority by the base station, the predetermined priority being usable by the mobile device to access the frequency subband.

* * * * *